United States Patent
Smith et al.

(10) Patent No.: US 12,209,535 B2
(45) Date of Patent: Jan. 28, 2025

(54) TURBINE ENGINE COMPRESSOR INTERCOOLER

(71) Applicant: Pratt & Whitney Canada Corp., Longueuil (CA)

(72) Inventors: Scott Smith, St-Lambert (CA); Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/211,133

(22) Filed: Jun. 16, 2023

(65) Prior Publication Data

US 2024/0418126 A1 Dec. 19, 2024

(51) Int. Cl.
- F02C 7/143 (2006.01)
- F02C 3/22 (2006.01)
- F02C 7/141 (2006.01)
- F02C 7/16 (2006.01)

(52) U.S. Cl.
CPC ............... *F02C 7/141* (2013.01); *F02C 3/22* (2013.01); *F02C 7/143* (2013.01); *F02C 7/16* (2013.01); *F05D 2260/213* (2013.01); *F05D 2260/232* (2013.01)

(58) Field of Classification Search
CPC .. F02C 7/141; F02C 7/143; F02C 7/16; F05D 2260/211; F05D 2260/213; F05D 2260/232; F28D 7/1615; F28D 7/1623; F28D 7/08; F28F 2250/10; F28F 2250/102; F28F 2250/106

See application file for complete search history.

(56) References Cited

U.S. PATENT DOCUMENTS

| | | | | |
|---|---|---|---|---|
| 2,960,825 A * | 11/1960 | Sampietro | ................. | F02C 7/36 475/72 |
| 3,486,340 A * | 12/1969 | Du Pont | ................. | F02C 7/143 60/262 |
| 5,678,408 A * | 10/1997 | Janes | ...................... | F02C 6/003 60/728 |
| 8,069,905 B2 * | 12/2011 | Goto | ..................... | F28D 7/1653 165/145 |
| 8,137,075 B2 | 3/2012 | Howe | | |
| 9,752,585 B2 * | 9/2017 | Kupratis | .................. | F02C 3/08 |

(Continued)

FOREIGN PATENT DOCUMENTS

DE 1020835 B * 12/1957 .............. F02C 7/143

*Primary Examiner* — Todd E Manahan
*Assistant Examiner* — Sean V Meiller
(74) *Attorney, Agent, or Firm* — Getz Balich LLC

(57) ABSTRACT

An aircraft propulsion system is provided that includes a turbine engine and an intercooler (IC). The turbine engine includes a source of non-hydrocarbon fuel, and a low pressure compressor having an LPC air inlet and outlet, and a high pressure compressor having an HPC air inlet and outlet. The intercooler has an IC air inlet, an IC air outlet, a U-shaped air passage, and crossflow tubes. The IC air inlet is in fluid communication with the LPC air outlet. The IC air outlet is in fluid communication with the HPC air inlet. The U-shaped air passage is in fluid communication with the IC air inlet and outlet. The crossflow tubes extend through the U-shaped air passage. The crossflow tubes are in fluid communication with the source of non-hydrocarbon fuel, and are configured to contain a flow of the non-hydrocarbon fuel therethrough.

16 Claims, 6 Drawing Sheets

(56) References Cited

U.S. PATENT DOCUMENTS

| | | |
|---|---|---|
| 10,823,070 B2 | 11/2020 | Suciu |
| 11,542,869 B2 | 1/2023 | Smith |
| 11,619,170 B1 | 4/2023 | Dierksmeier |
| 2023/0022809 A1 | 1/2023 | Smith |

* cited by examiner

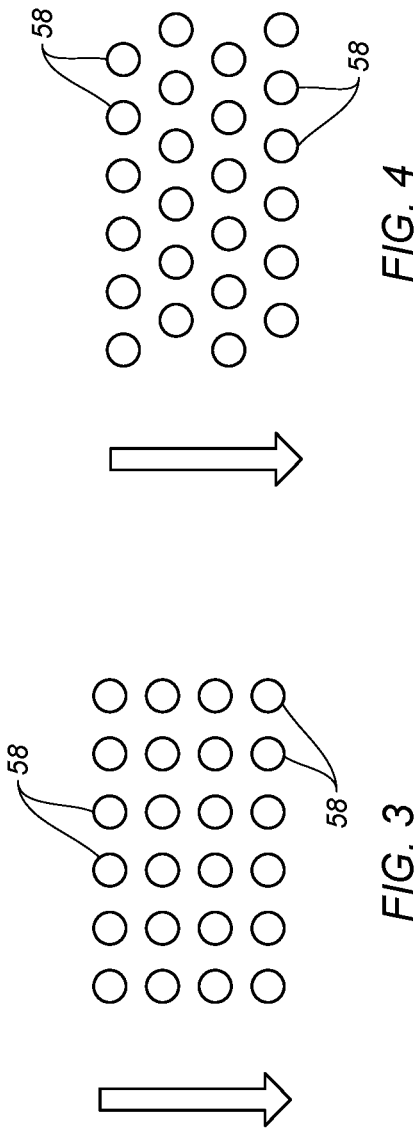

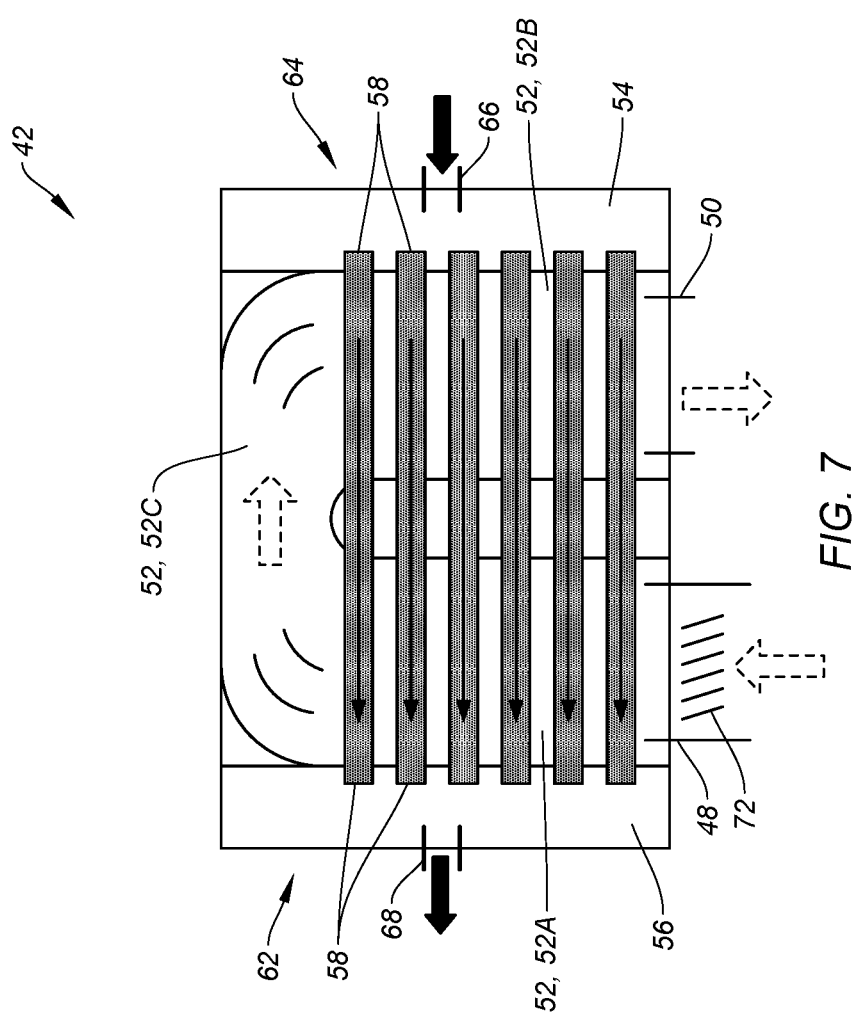

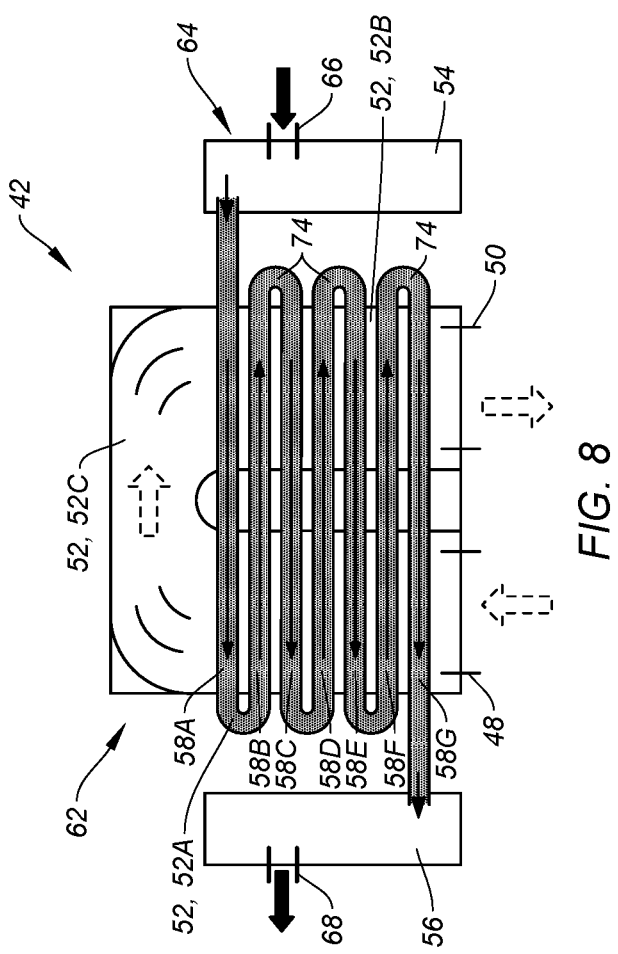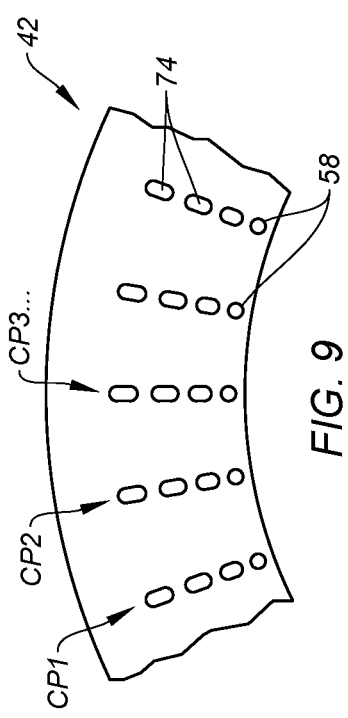

TURBINE ENGINE COMPRESSOR INTERCOOLER

BACKGROUND OF THE INVENTION

1. Technical Field

The present disclosure relates to aircraft in general, and to an aircraft turbine engine system with core airflow cooling in particular.

2. Background Information

Turbine engines compress air, add fuel to the compressed air, and combust the air/fuel mixture. The combustion products are used to a power one or more turbine sections and in some instances is used to provide motive thrust. The aforesaid combustion products create a very high temperature environment that limits the types of materials that can be used in downstream components. To mitigate the high temperature environment, it is known to use cooling air to cool certain components exposed to the core flow path. The cooling lowers the component temperature and thereby makes it possible to construct the components from a material that has a lower maximum temperature threshold that would be required in the absence of cooling. Hence, there is always a need to improve turbine engine cooling.

SUMMARY

According to an aspect of the present disclosure, an aircraft propulsion system is provided that includes a turbine engine and an intercooler (IC). The turbine engine includes a source of non-hydrocarbon fuel, a low pressure compressor (LPC) having an LPC air inlet and an LPC air outlet, a high pressure compressor (HPC) having an HPC air inlet and an HPC air outlet, a combustor section, and a turbine section. The intercooler has an IC air inlet, an IC air outlet, a U-shaped air passage, and a plurality of crossflow tubes. The IC air inlet is in fluid communication with the LPC air outlet. The IC air outlet is in fluid communication with the HPC air inlet. The U-shaped air passage is in fluid communication with the IC air inlet and the IC air outlet. The crossflow tubes extend through the U-shaped air passage, substantially orthogonal to an airflow encountering the plurality of crossflow tubes within the U-shaped air passage. The plurality of crossflow tubes are in fluid communication with the source of non-hydrocarbon fuel, and are configured to contain a flow of the non-hydrocarbon fuel therethrough.

In any of the aspects or embodiments described above and herein, the U-shaped air passage may include a first leg in fluid communication with the IC air inlet, a second leg in fluid communication with the IC air outlet, and a turn section extending between the first leg and the second leg, wherein the first leg, the turn section, and the second leg are arranged in fluidic series with one another.

In any of the aspects or embodiments described above and herein, the first leg may be configured to define a first airflow direction within U-shaped air passage, and the second leg may be configured to define a second airflow direction within U-shaped air passage, and the first airflow direction is substantially opposite the second airflow direction.

In any of the aspects or embodiments described above and herein, at least portions of the first leg and the second leg may be parallel to one another.

In any of the aspects or embodiments described above and herein, the plurality of crossflow tubes may extend through the first leg, or the second leg, or both.

In any of the aspects or embodiments described above and herein, the intercooler may further include an inlet manifold in fluid communication with the source of non-hydrocarbon fuel and in fluid communication with the plurality of crossflow tubes.

In any of the aspects or embodiments described above and herein, the intercooler may further include an outlet manifold in fluid communication with the plurality of crossflow tubes.

In any of the aspects or embodiments described above and herein, the outlet manifold may be in fluid communication with the combustor.

In any of the aspects or embodiments described above and herein, the plurality of crossflow tubes may be arranged in an array of rows and columns.

In any of the aspects or embodiments described above and herein, the plurality of crossflow tubes may be arranged in an aligned configuration.

In any of the aspects or embodiments described above and herein, the plurality of crossflow tubes may be arranged in a staggered configuration.

In any of the aspects or embodiments described above and herein, the intercooler may further include a plurality of heat transfer features extending out from one or more of the plurality of crossflow tubes that extend through the first leg, or the second leg, or both. The plurality of heat transfer features may be fins aligned with the first airflow direction or the second airflow direction.

In any of the aspects or embodiments described above and herein, each crossflow tube of the plurality of crossflow tubes has a cross-sectional geometry and all the crossflow tubes in the plurality of crossflow tubes may have the same cross-sectional geometry.

In any of the aspects or embodiments described above and herein, the plurality of crossflow tubes may have a circular cross-sectional geometry.

In any of the aspects or embodiments described above and herein, the cross-sectional geometry of the plurality of crossflow tubes may have a length over diameter ratio (L/d) greater than one, and the length of the cross-sectional geometry of the plurality of crossflow tubes may be aligned with a direction of the airflow encountering the plurality of crossflow tubes within the U-shaped air passage.

In any of the aspects or embodiments described above and herein, the system may further include an inter-compressor duct that extends between the IC air outlet and the HPC air inlet to create the fluid communication therebetween.

In any of the aspects or embodiments described above and herein, the plurality of crossflow tubes extending through the U-shaped air passage may include crossflow tubes in a serpentine configuration, wherein each crossflow tube serpentine configuration is disposed at a different circumferential position within the intercooler.

According to an aspect of the present disclosure, an inter-compressor intercooler for use with a turbine engine that includes a low pressure compressor (LPC) having an LPC air inlet and an LPC air outlet, and a high pressure compressor (HPC) having an HPC air inlet and an HPC air outlet is provided. The intercooler includes an intercooler (IC) air inlet, an IC air outlet, a U-shaped air passage, and a plurality of crossflow tubes. The IC air inlet is configured for fluid communication with the LPC air outlet. The IC air outlet is configured for fluid communication with the HPC air inlet. The U-shaped air passage is in fluid communication with the IC air inlet and the IC air outlet. The plurality of crossflow tubes extend through the U-shaped air passage, substantially orthogonal to an airflow encountering the plurality of crossflow tubes within the U-shaped air passage. The crossflow tubes are in fluid communication with the source of non-hydrocarbon fuel, and are configured to contain a flow of non-hydrocarbon fuel therethrough.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 3 is a diagrammatic representation of an embodiment of an array of intercooler crossflow tubes.

FIG. 4 is a diagrammatic representation of an embodiment of an array of intercooler crossflow tubes.

FIG. 5 is a diagrammatic representation of a crossflow tube embodiment.

FIG. 7 is a diagrammatic representation of a present disclosure intercooler embodiment.

FIG. 8 is a diagrammatic representation of a present disclosure intercooler embodiment.

FIG. 9 is a diagrammatic representation illustrating serpentine crossflow tube configurations disposed at circumferential positions.

DETAILED DESCRIPTION

Figure 1:
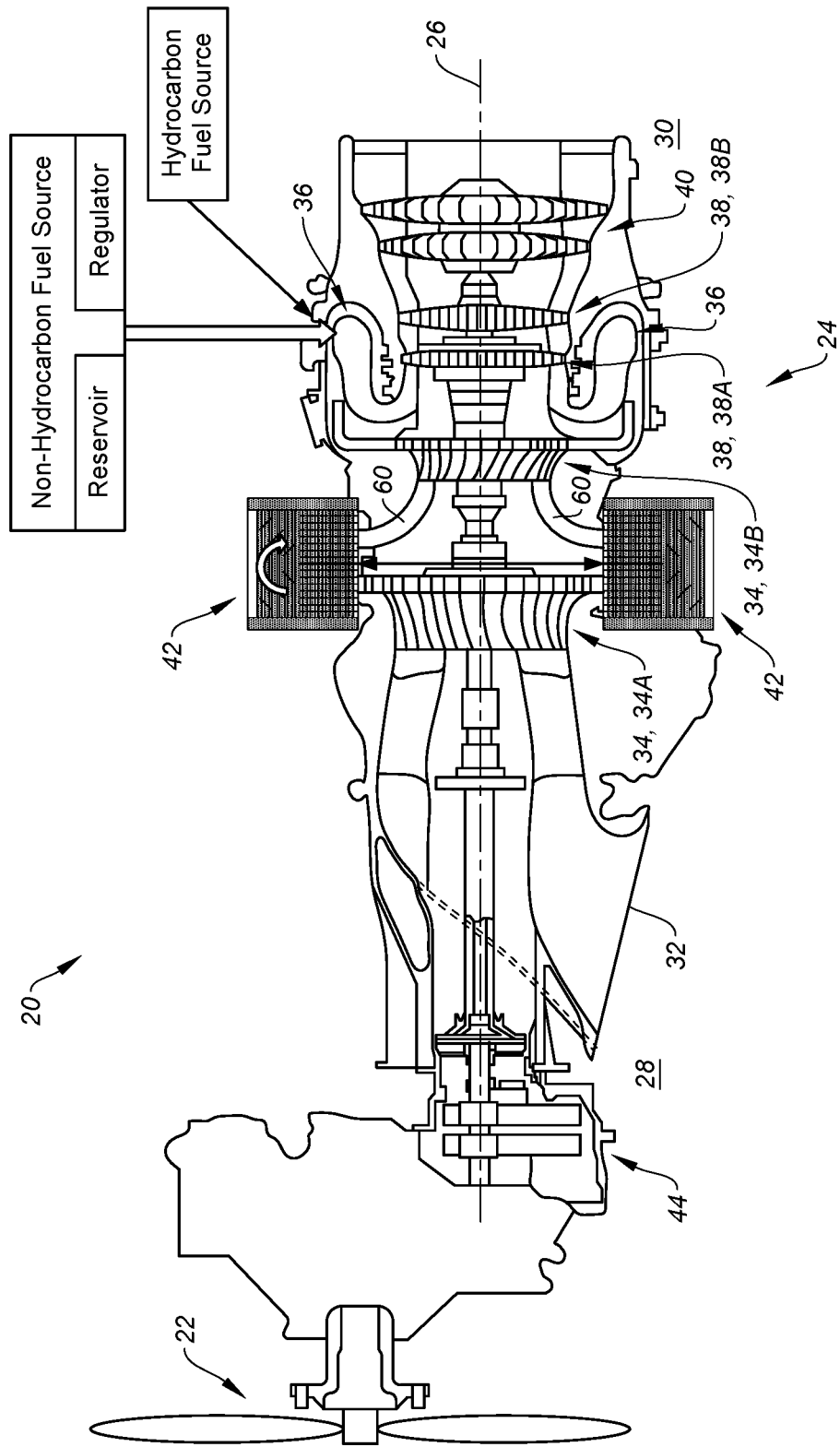
FIG. 1 is a diagrammatic representation of a present disclosure propulsion system embodiment.

FIG. 1 diagrammatically illustrates a propulsion system 20 for an aircraft. The aircraft may be an airplane, a helicopter, a drone (e.g., an unmanned aerial vehicle (UAV)) or any other manned or unmanned aerial vehicle or system. The propulsion system 20 shown in FIG. 1 includes a propulsor rotor 22 and a turbine engine 24. Non-limiting examples of a propulsor rotor 22 include a propeller rotor for a turboprop propulsion system, a rotorcraft rotor (e.g., a main helicopter rotor) for a turboshaft propulsion system, a propfan rotor for a propfan propulsion system, a pusher fan rotor for a pusher fan propulsion system, a fan for a turbofan propulsion system, or the like. Unless otherwise stated herein, the present disclosure is not limited to any particular propulsor rotor configuration.

The turbine engine 24 extends axially along an axis 26 between an upstream, forward end 28 and a downstream, aft end 30. The turbine engine 24 includes an air inlet 32, a compressor section 34 having a low pressure compressor (LPC) 34A and a high pressure compressor (HPC) 34B, a combustor section 36, and a turbine section 38 having a high pressure turbine (HPT) 38A and a low pressure turbine (LPT) 38B. In the exemplary engine embodiment shown in FIG. 1, the engine 24 further includes a pair of power turbines 40. The LPC 34A and the HPC 34B are shown as centrifugal compressors, but may be axial compressors alternatively. As will be detailed herein, an annular compressor intercooler 42 is disposed to receive a flow of air pressurized by the LPC 34A and to provide that pressurized airflow to the HPC 34B. The engine 24 includes a reduction gearbox 44 that provides drive communication between an engine shaft and the propulsor rotor 22. The engine example shown in FIG. 1 is a non-limiting example of a gas turbine engine 24 configuration that may be configured pursuant to aspects of the present disclosure. This example is not intended to be limiting.

Embodiments of the present disclosure propulsion system 20 may be directed to a turbine engine 24 configured to combust non-hydrocarbon fuels (e.g., hydrogen or "$H_2$"), or hydrocarbon fuels (e.g., aviation fuel), or some mixture thereof. For example, the turbine engine 24 within a present disclosure system embodiment may be configured to combust a fuel that is 100% non-hydrocarbon (e.g., 100% $H_2$), or a fuel that is 100% hydrocarbon (e.g., 100% aviation fuel), or a mixture thereof (e.g., a mixture of $H_2$ and aviation fuel). The present disclosure is not limited to any combusting any particular fuel.

In those embodiments wherein the present disclosure system 20 combusts hydrogen, the present disclosure system 20 may include a fuel source 46 configured to store the hydrogen in liquid form. The fuel source 46 includes a fuel reservoir and may include a fuel flow regulator. The fuel reservoir may be configured to store a quantity of liquid non-hydrocarbon fuel (e.g., liquid H2) and may be configured as an insulated vessel. The fuel flow regulator is configured to regulate fuel flow from the fuel reservoir to the turbine engine 24.

As will be described herein, prior to combusting the non-hydrocarbon fuel to produce motive power, the present disclosure system 20 may use the non-hydrocarbon fuel for one or more different purposes; e.g., act as a coolant, to power a component such as a turboexpander, and the like. The description below details how the non-hydrocarbon fuel may be used within a compressor intercooler 42. The present disclosure is not limited to using the non-hydrocarbon fuel within a compressor intercooler 42; i.e., the non-hydrocarbon fuel may be used for additional purposes.

Figure 2:
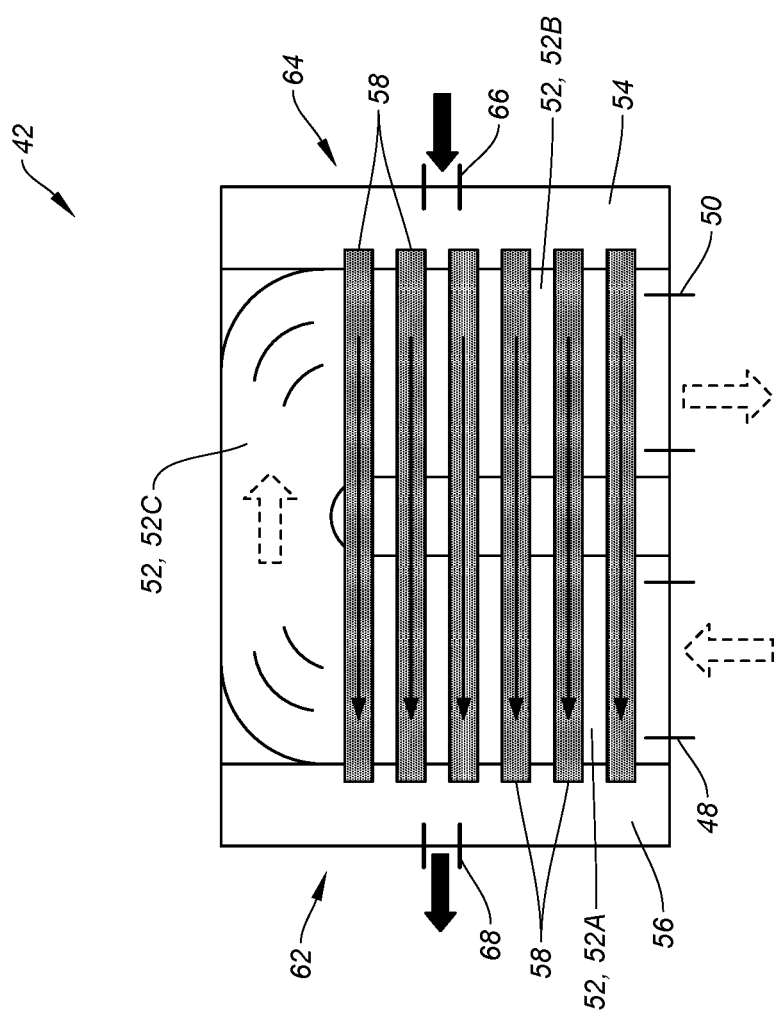
FIG. 2 is a diagrammatic representation of a present disclosure intercooler embodiment.

Referring to FIGS. 1 and 2, embodiments of the present disclosure include an annular compressor intercooler 42 configured to selectively cool air pressurized by the LPC 34A as it flows between the LPC 34A and the HPC 34B. The intercooler 42 includes an intercooler inlet 48 (see FIG. 2), an intercooler outlet 50, a U-shaped air passage 52, an inlet manifold 54, an exit manifold 56, and a plurality crossflow tubes 58. The intercooler inlet 48 is configured to receive a radial flow of air pressurized by the LPC 34A; i.e., airflow exiting an outlet of the LPC 34A. The U-shaped air passage 52 may be an annular body that includes a first leg 52A and a second leg 52B in fluid communication with one another via a turn section 52C. The first and second legs 52A, 52B may be substantially parallel to one another and each has an airflow axis that extends therethrough. The intercooler inlet 48 is in fluid communication with the first leg 52A. The turn section 52C is configured such that air flow from the first leg 52A is turned about 180 degrees and subsequently enters the second leg 52B. The second leg 52B is in fluid communication with the intercooler outlet 50. Hence, the first leg 52A, the turn section 52C, and the second leg 52B may be described as being in a fluidic series arrangement. Referring to FIG. 1, an inter-compressor duct 60 extends from the intercooler outlet 50 to an air inlet of the HPC 34B. The inter-compressor duct 60 is configured to turn radial airflow exiting the intercooler 42 to an axial flow entering the air inlet of the HPC 34B. The intercooler 42 may be described as having a forward side 62 and an aft side 64, opposite the forward side 62. The first leg 52A of the U-shaped air passage 52 is disposed adjacent to the forward side 62 and the second leg 52B of the U-shaped air passage 52 is disposed adjacent to the aft side 64.

Figure 6:
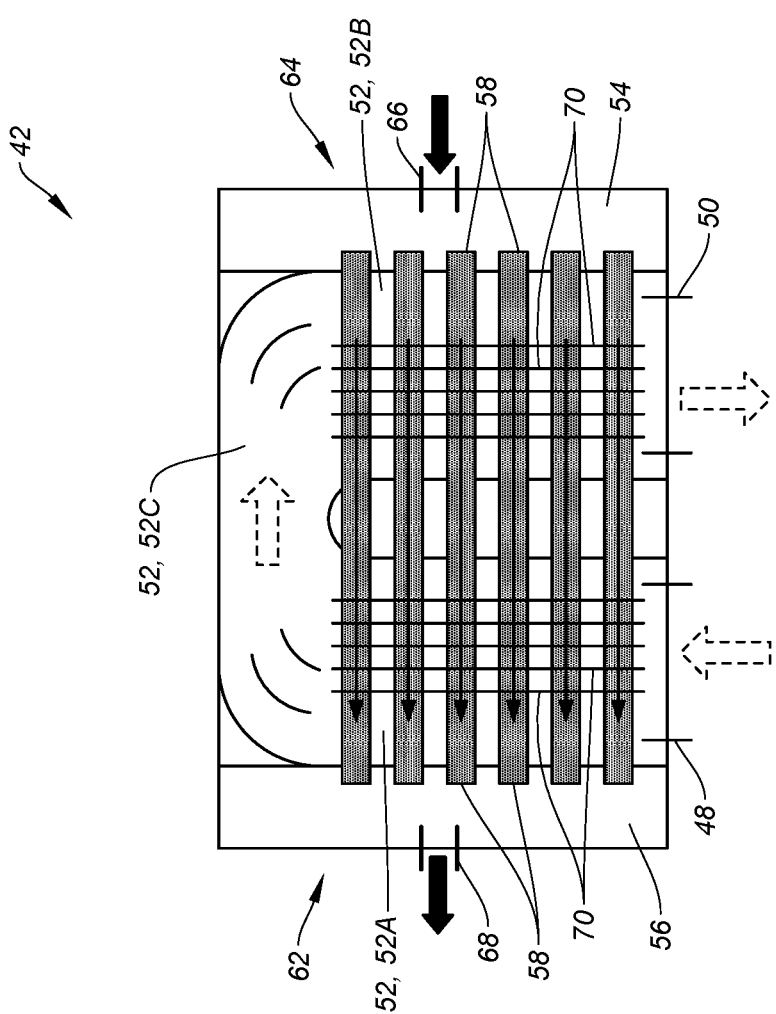
FIG. 6 is a diagrammatic representation of a present disclosure intercooler embodiment.

In the embodiments shown in FIGS. 2, 6, and 7, the inlet manifold 54 is disposed on the aft side 64 of the intercooler 42 and the exit manifold 56 is disposed on the forward side 62 of the intercooler 42. In alternative embodiments, the inlet manifold 54 may be disposed on the forward side 62 of the intercooler 42 and the exit manifold 56 may be disposed on the aft side 66 of the intercooler 42. The inlet and exit manifolds 54, 56 each may be an annular structure that extends continuously around the circumference of the intercooler 42, or one or both of the inlet and exit manifolds 54, 56 may include a plurality of manifold segments, with each segment extending a distance circumferentially. The inlet manifold 54 includes at least one inlet port 66 that may be configured to receive a flow of non-hydrocarbon fuel directly or indirectly from the fuel source 46. The exit manifold 56 includes at least one outlet port 68 that is in fluid communication with the engine fuel system that provides the non-hydrocarbon fuel to the engine 24 for combustion. Non-hydrocarbon fuel exiting the intercooler 42 (i.e., via the exit manifold 56) may pass directly to the turbine engine combustor 36, or pass indirectly to the combustor 36 after traversing other system structure; e.g., other cooling structure, or structure that uses the non-hydrocarbon fuel for work, or that converts liquid non-hydrocarbon fuel to gaseous non-hydrocarbon fuel, and the like.

Each of the crossflow tubes 58 extends between and provides fluid communication between the inlet manifold 54 and the exit manifold 56. In the embodiments shown in FIGS. 2, 6, and 7, the crossflow tubes 58 extend through both the first leg 52A and the second leg 52B of the U-shaped air passage 52. In alternative embodiments, the crossflow tubes 58 may extend through the first leg 52A or the second leg 52B of the U-shaped air passage 52 but not both. FIG. 2 diagrammatically illustrates the crossflow tubes 58 as straight tubes extending through the first leg 52A and the second leg 52B to facilitate the description herein, and the present disclosure is not limited to this crossflow tube 58 configuration. An example of an alternative crossflow tube 58 configuration is shown in FIGS. 8 and 9. In this embodiment, a crossflow tube 58 extends in a serpentine configuration. The example shown in FIG. 8 includes crossflow tube segments 58A-G with each pair of adjacent segments fluidically connected to one another by a segment return 74. Crossflow tube segment 58A is in fluid communication with the inlet manifold 54 and crossflow tube segment 58G is in fluid communication with the exit manifold 56. Hence, the serpentine crossflow tube 58 configuration provides a fluid path for non-hydrocarbon fuel that extends from the inlet manifold 54, sequentially through the crossflow tube segments 58A-58G, and into the exit manifold 56. In this embodiment, the intercooler 42 may include a plurality of serpentine crossflow tube 58 configurations spaced apart from one another around the circumference of the annular intercooler 42. FIG. 9 diagrammatically illustrates serpentine crossflow tube 58 configurations circumferentially spaced apart from one another; e.g., disposed at a first circumferential position (CP1), at a second circumferential position (CP2), at a third circumferential position (CP3), and so on. The crossflow tube 58 embodiments detailed above are examples of possible tube configurations and the present disclosure is not limited to these examples.

The number and configuration of the crossflow tubes 58 can be varied to suit the application. FIG. 3, for example, diagrammatically illustrates an array of crossflow tubes 58 disposed in aligned rows and columns. FIG. 4 diagrammatically illustrates an array of crossflow tubes 58 wherein the crossflow tubes 58 disposed in adjacent rows are staggered. In both FIGS. 3 and 4, the arrow diagrammatically illustrates the airflow through the U-shaped air passage 52 substantially orthogonal to the crossflow tubes 58. The crossflow tube 58 arrangements shown in FIGS. 3 and 4 are examples of how an array of crossflow tubes 58. The present disclosure is not limited to any particular crossflow tube 58 arrangement.

The present disclosure is described above as including inlet and exit manifolds 54, 56 disposed on opposite sides of the intercooler 42. The present disclosure is not limited to this embodiment. In alternative embodiments, other structure may be disposed on opposite sides of the intercooler 42 to provide and receive the non-hydrocarbon fuel passing through the crossflow tubes 58.

The present disclosure is described above as having a plurality of crossflow tubes 58 (shown as circular) extending through the U-shaped air passage 52. In an alternative embodiment diagrammatically shown in FIG. 5, the crossflow tubes 58 may have an L/D greater than one, with the L/D oriented so that the passing airflow travels along the longer L length extending through the U-shaped air passage 52. The present disclosure as described and diagrammatically shown in the FIGS. 3 and 4 shows all the crossflow tubes 58 having the same cross-sectional geometry. The present disclosure is not limited to these example; e.g., the crossflow tubes 58 are not limited to any particular cross-sectional geometry, and more than one crossflow tube cross-sectional geometry may be used.

In some embodiments, the present disclosure intercooler 42 may include heat transfer features 70 in communication with the crossflow tubes 58, positioned to engage with the air flow passing through the U-shaped air passage 52. Examples of heat transfer features 70 include pins, fins, and the like extending out from the respective crossflow tubes 58. The heat transfer features 70 may be disposed on the portions of the crossflow tubes 58 in the first leg 52A of the U-shaped air passage 52, or disposed on the portions of the crossflow tubes 58 in the second leg 52B of the U-shaped air passage 52, or both. FIG. 6 illustrates fins 70 extending generally parallel to the airflow direction within both the first and second legs 52A, 52B of the U-shaped air passage 52.

Referring to FIG. 7, in some embodiments the present disclosure intercooler 42 may include vanes 72 disposed upstream of the first leg 52A of the U-shaped air passage 52 to orient the air flow entering the intercooler 42 in a desirable manner. For example, the vanes 72 may be configured to guide the airflow, or to diffuse the airflow, or the like, or any combination thereof. The present disclosure is not limited to any particular vane 72 orientation or configuration.

In the operation of the present disclosure propulsion system 20, air is drawn into the engine air inlet 32 and is passed to the LPC 34A. The air is worked within the LPC 34A to a higher pressure and temperature and is passed from the LPC 34A to the intercooler 42 prior to entering the HPC 34B. More specifically the air enters the intercooler inlet 48 and passes into the first leg 52A of the U-shaped air passage 52. In those embodiments that include guide/diffuser vanes 72, the airflow passes through the vanes 72 prior to passing into the first leg 52A of the U-shaped air passage 52.

Airflow passing through the first leg 52A of the U-shaped air passage 52 travels in a first direction (e.g., in an outer radial direction). Airflow passing through the second leg 52B of the U-shaped air passage 52 travels in a second direction (e.g., in an inner radial direction), opposite the first direction. As the airflow passes through the first leg 52A of the U-shaped air passage 52, the airflow will contact and traverse the portion of the crossflow tubes 58 extending through the first leg 52A. From there, the airflow passes through the turn section 52C of the U-shaped air passage 52 and is directed into the second leg 52B of the U-shaped air passage 52. The passage of the airflow through the turn section 52C turns the airflow about 180 degrees, causing the airflow to exit the turn section 52C in a direction that is substantially opposite the direction it entered the turn section 52C. As the airflow passes through the second leg 52B of the U-shaped air passage 52, the airflow will contact and traverse another portion of the crossflow tubes 58 that extend through the second leg 52B. From there, the airflow enters the inter-compressor duct 60 and passes to the HPC 34B.

At the same time that the airflow is passing through the U-shaped air passage 52, a flow of fuel is provided to the inlet manifold 54. In those embodiments wherein the engine 24 is configured to combust a non-hydrocarbon fuel (e.g., $H_2$) solely or in combination with a hydrocarbon fuel, the flow of fuel provided to the intercooler 42 may be a liquid non-hydrocarbon fuel provided by the fuel source 46, or alternatively the fuel may be in a gaseous state. Regardless of whether the fuel is supplied to the inlet manifold 54 in liquid or gaseous state, the inlet manifold 54 distributes the fuel to the crossflow tubes 58. The fuel passes through the crossflow tubes 58, enters and passes through the exit manifold 56, and is subsequently directly or indirectly provided to the engine combustor 36.

The fuel passing through the crossflow tubes 58 in a direction orthogonal to the airflow through the U-shaped air passage 52 creates heat transfer between the two fluids; i.e., the compressed air is cooled and the fuel is heated. The fuel may be heated sufficiently to change the state of the non-hydrocarbon fuel from a liquid state to a gaseous state. Elevating the temperature of the airflow prior to the airflow entering the HPC has the benefit of decreasing the thermal requirements downstream of the intercooler 42 (e.g., in the HPC 34B, combustor 36, and the like) and potentially increasing the efficiency of the engine 24.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising;
   a turbine engine that includes:

a source of non-hydrocarbon fuel;
a low pressure compressor (LPC) having an LPC air inlet and an LPC air outlet;
a high pressure compressor (HPC) having an HPC air inlet and an HPC air outlet;
a combustor section; and
a turbine section;
an intercooler (IC) having an IC air inlet in fluid communication with the LPC air outlet, and an IC air outlet in fluid communication with the HPC air inlet, a U-shaped air passage in fluid communication with the IC air inlet and the IC air outlet, and a plurality of crossflow tubes extending through the U-shaped air passage, substantially orthogonal to an airflow encountering the plurality of crossflow tubes within the U-shaped air passage, the plurality of crossflow tubes in fluid communication with the source of non-hydrocarbon fuel, and configured to contain a flow of the non-hydrocarbon fuel therethrough; and
an inter-compressor duct that extends from an aft side of the intercooler between the IC air outlet and the HPC air inlet to create the fluid communication therebetween;
wherein the U-shaped air passage includes a first leg in fluid communication with the IC air inlet, a second leg in fluid communication with the IC air outlet, and a turn section extending between the first leg and the second leg, wherein the first leg, the turn section, and the second leg are arranged in fluidic series with one another;
wherein the first leg is configured to define a first airflow direction within U-shaped air passage, and the second leg is configured to define a second airflow direction within U-shaped air passage, and the first airflow direction is substantially opposite the second airflow direction; and
wherein the plurality of crossflow tubes extend through both the first leg and the second leg.

2. The propulsion system of claim 1, wherein at least portions of the first leg and the second leg are parallel to one another.

3. The propulsion system of claim 1, wherein the LPC is a first centrifugal compressor, the HPC is a second centrifugal compressor, and the intercooler is disposed radially outside of the LPC.

4. The propulsion system of claim 1, wherein the intercooler further comprises an inlet manifold in fluid communication with the source of non-hydrocarbon fuel and in fluid communication with the plurality of crossflow tubes.

5. The propulsion system of claim 4, wherein the intercooler further comprises an outlet manifold in fluid communication with the plurality of crossflow tubes.

6. The propulsion system of claim 5, wherein the outlet manifold is in fluid communication with the combustor section.

7. The propulsion system of claim 1, wherein the plurality of crossflow tubes are arranged in an array of rows and columns.

8. The propulsion system of claim 7, wherein the plurality of crossflow tubes are arranged in an aligned configuration.

9. The propulsion system of claim 7, wherein the plurality of crossflow tubes are arranged in a staggered configuration.

10. The propulsion system of claim 1, wherein the intercooler further comprises a plurality of heat transfer features extending out from one or more of the plurality of crossflow tubes that extend through the first leg, or the second leg, or both.

11. The propulsion system of claim 10, wherein the plurality of heat transfer features are fins aligned with the first airflow direction or the second airflow direction.

12. The propulsion system of claim 1, wherein each crossflow tube of the plurality of crossflow tubes has a cross-sectional geometry and all the crossflow tubes in the plurality of crossflow tubes have the same said cross-sectional geometry.

13. The propulsion system of claim 12, wherein the plurality of crossflow tubes have a circular cross-sectional geometry.

14. The propulsion system of claim 12, wherein the cross-sectional geometry of the plurality of crossflow tubes have a length over diameter ratio (L/d) greater than one.

15. The propulsion system of claim 14, wherein the length of the cross-sectional geometry of the plurality of crossflow tubes is aligned with a direction of the airflow encountering the plurality of crossflow tubes within the U-shaped air passage.

16. An inter-compressor intercooler for use with a turbine engine that includes a low pressure compressor (LPC) having an LPC air inlet and an LPC air outlet, and a high pressure compressor (HPC) having an HPC air inlet and an HPC air outlet, the intercooler comprising:
an intercooler (IC) air inlet configured for fluid communication with the LPC air outlet;
an IC air outlet configured for fluid communication with the HPC air inlet;
a U-shaped air passage in fluid communication with the IC air inlet and the IC air outlet; and
a plurality of crossflow tubes extending through the U-shaped air passage, each said crossflow tube configured to contain a flow of non-hydrocarbon fuel therethrough;
wherein the U-shaped air passage includes a first leg in fluid communication with the IC air inlet, a second leg in fluid communication with the IC air outlet, and a turn section extending between the first leg and the second leg, wherein the first leg, the turn section, and the second leg are arranged in fluidic series with one another;
wherein the first leg is configured to define a first airflow direction within U-shaped air passage, and the second leg is configured to define a second airflow direction within U-shaped air passage, and the first airflow direction is substantially opposite the second airflow direction;
wherein an inter-compressor duct that extends from an aft side of the intercooler between the IC air outlet and the HPC air inlet to create the fluid communication therebetween; and
wherein the plurality of crossflow tubes extend through both the first leg and the second leg and are arranged to extend in a direction that is substantially orthogonal to the first airflow direction and the second airflow direction.

\* \* \* \* \*